United States Patent
Hong

[11] Patent Number: 6,102,331
[45] Date of Patent: Aug. 15, 2000

[54] OPERATION OF AIRPORTS

[76] Inventor: Lee Pee Hong, No. 446, Jalan Desa Utama, Taman Desa off Jalan Klane, Lame Kuala Lumpur, 58100, Malaysia

[21] Appl. No.: 08/941,485

[22] Filed: Oct. 1, 1997

[30] Foreign Application Priority Data

Oct. 1, 1996 [MY] Malaysia .............................. PI 9604067

[51] Int. Cl.⁷ ........................................................ B64F 1/00
[52] U.S. Cl. .................................. 244/114 R; 244/137.2; 244/116; 244/137.1; 114/260; 114/258
[58] Field of Search ............................ 244/114 R, 137.1, 244/137.2, 115, 116; 114/259, 258, 260

[56] References Cited

U.S. PATENT DOCUMENTS

| | | |
|---|---|---|
| 2,374,938 | 5/1945 | Hundley . |
| 2,405,115 | 8/1946 | Creed . |
| 2,639,107 | 5/1953 | Brown . |
| 2,807,429 | 9/1957 | Hawkins et al. . |
| 2,942,425 | 6/1960 | De Long et al. . |
| 3,191,566 | 6/1965 | Wilken et al. . |
| 3,291,242 | 12/1966 | Tinajero . |
| 3,419,164 | 12/1968 | O'Neill . |
| 3,599,589 | 8/1971 | Busey . |
| 4,416,435 | 11/1983 | Szendrodi et al. . |
| 4,457,554 | 7/1984 | Fuisz et al. .............................. 296/179 |
| 4,799,828 | 1/1989 | Georgii . |
| 4,895,319 | 1/1990 | Bardsen et al. . |
| 5,135,346 | 8/1992 | Roach . |

FOREIGN PATENT DOCUMENTS

| | | |
|---|---|---|
| 2541232 | 8/1984 | France . |
| 275575 | 1/1990 | Germany . |
| 1085459 | 10/1967 | United Kingdom . |
| 1270543 | 4/1972 | United Kingdom . |
| 1302910 | 1/1973 | United Kingdom . |
| WO93/18967 | 9/1993 | WIPO . |
| WO96/23691 | 8/1996 | WIPO . |

*Primary Examiner*—Peter M. Poon
*Assistant Examiner*—Tien Dinh
*Attorney, Agent, or Firm*—Jacobson, Price, Holman & Stern, PLLC

[57] ABSTRACT

The present invention provides an airport and a method of operating an airport in which, when an aircraft lands on a runway of the airport, the aircraft drives onto or otherwise boards a vehicle and is transported on the vehicle to a disembarking/embarking site. Here, inbound passengers leave the vehicle and proceed to a terminal building. In addition, outbound passengers board the vehicle, which then transports the aircraft to the runway from where it takes off. Various activities take place whilst the aircraft is on the vehicle. Thus, passengers embark/disembark the vehicle, pass through immigration and check-in areas and their baggage is unloaded/loaded. In addition, the aircraft is serviced whilst on the vehicle.

26 Claims, 4 Drawing Sheets

OPERATION OF AIRPORTS

OPERATION OF AIRPORTS

The present invention relates to airports and their operation.

Conventionally, passenger airports around the world are operated in the following manner. After landing on a runway, an aircraft taxis to a parking position which is usually, but not always, a gate position at the airport terminal building. The inbound passengers disembark the aircraft at the parking position and proceed into the terminal building, either directly when the aircraft is parked at a gate position or by means of a bus when the aircraft is parked away from the terminal building. The baggage and/or cargo carried by the aircraft is unloaded and is transported to a baggage sorting area and the cargo is transported to a cargo handling area. Whilst parked, the aircraft is serviced, i.e. refuelled, cleaned internally, restocked with food for passengers, etc., so as to be ready to depart on its next flight.

When in the terminal building, inbound passengers proceed through an immigration control area (if applicable) and a duty-free shopping area (if applicable). Meanwhile, their baggage is transported from the baggage sorting area to a baggage collection area. The inbound passengers collect their baggage from the baggage collection area and then proceed through a customs control area (if applicable) and thence out of the terminal building.

Passengers who are in transit to an ongoing destination or are transferring to another aircraft (transfer passengers) disembark with the inbound passengers and proceed to a transit lounge and duty-free shopping area (if applicable), prior to proceeding to the requisite gate to board the aircraft departing for their next destination. Their baggage is transported from the baggage sorting area to the gate from which the aircraft is to depart and is loaded onto that aircraft.

Finally, passengers embarking on a flight (hereinafter termed "outbound passengers") arrive at the terminal building and proceed to a check-in area, where their baggage is passed to a baggage sorting area. The outbound passengers then proceed from the check-in area through an immigration control area (if applicable) and to a departure lounge which may include a duty-free shopping area. From here, they proceed to the gate from which their aircraft is to depart and then board the aircraft. Meanwhile, their baggage is transported from the baggage sorting area to the gate from which their aircraft is to depart, where it is loaded onto the aircraft. The aircraft, having been appropriately serviced, leaves the gate when the outbound passengers and any transfer passengers have embarked and their baggage and any cargo has been loaded, and taxis to the runway from where it takes off. Security checks are usually carried out on passengers and their hand luggage before boarding the aircraft, and there may be a security check on the remaining luggage in the luggage sorting area.

However, this conventional system of operation means that the airport must occupy large areas of land. The siting of runways and the layout of the airport must suit topographical conditions, as well as meeting the requirements concerning prevailing winds, approach clearances and other environmental parameters. Ever-increasing passenger numbers and runway utilisation demands result in ever-increasing aircraft taxiing distances and often inadequate numbers of gates at the terminal building, together with ever-lengthening and increasingly complex movement systems for passengers and, in particular, baggage. All of this causes the turn-around times of the aircraft to increase.

Furthermore, the costs of constructing airports to fulfil the requirements of the conventional airport operating systems are very high, as are maintenance costs of these airports, particularly in respect of passenger and baggage movement systems, and also the costs of expanding and upgrading to accommodate changes in technology.

Accordingly, there is a need for an alternative system of operating an airport.

In accordance with a first aspect of the present invention, there is provided an airport comprising:
- a runway for an aircraft to land on/take off from;
- at least one vehicle for carrying aircraft from/to the runway to/from an disembarking/embarking site at which passengers disembark/embark the vehicles;
- a terminal building; and
- means for transporting passengers from/to the disembarking/embarking site to/from the terminal building.

In a preferred embodiment, the airport further comprises predetermined paths along which the vehicle travels between the runway and the disembarking/embarking site. The predetermined paths may be waterways, the vehicle being a barge, and the runway may be built over the sea.

Preferably, the vehicle includes various facilities that allow activities conventionally carried out at a parking position to be carried out on the vehicle. Thus, the vehicle may include one or more of the following: means for passengers to embark/disembark the aircraft; means for loading/unloading baggage and/or cargo from the aircraft; means for inbound passengers to collect their baggage; an immigration control area for inbound passengers; and a check-in area and an immigration control area for outbound passengers. It is also preferred if the vehicle is adapted and equipped for servicing the aircraft.

The disembarking/embarking site may include a transit lounge for transfer passengers and a security check area for outbound passengers.

In accordance with a second aspect of the present invention, there is provided a method of operating an airport in accordance with the first aspect of the present invention, the method comprising:
- when an aircraft lands on the runway, conveying the aircraft onto a vehicle on which the inbound passengers disembark the aircraft;
- transporting the aircraft on the vehicle from the runway to the disembarking/embarking site, the inbound passengers disembarking the vehicle when it arrives at the disembarking/embarking site;
- transporting the inbound passengers from the disembarking/embarking site to the terminal building;
- transporting outbound passengers from the terminal building to the disembarking/embarking site for the outbound passengers to embark the vehicle; and
- transporting the aircraft on the vehicle from the disembarking/embarking site to the runway from which the aircraft is to take off, the outbound passengers embarking the aircraft on the vehicle,
- the aircraft being serviced whilst it is on the vehicle.

In accordance with a third aspect of the present invention, there is provided a method of operating an airport, comprising:
- when an aircraft lands on a runway of the airport, conveying the aircraft onto a vehicle on which the inbound passengers of the aircraft disembark the aircraft;
- transporting the aircraft on the vehicle from the runway to a disembarking/embarking site at which the inbound passengers disembark the vehicle;

transporting the inbound passengers from the disembarking/embarking site to a terminal building;

transporting outbound passengers from the terminal building to the disembarking/embarking site for the outbound passengers to embark the vehicle; and transporting the aircraft on the vehicle from the disembarking/embarking site to the runway for the aircraft to take off, the outbound passengers embarking the aircraft on the vehicle, the aircraft being serviced whilst it is on the vehicle.

In accordance with a fourth aspect of the present invention, there is provided a method of handling inbound passengers arriving at an airport on an aircraft, comprising:

when the aircraft lands on a runway of the airport, conveying the aircraft onto a vehicle on which the inbound passengers disembark the aircraft;

transporting the aircraft on the vehicle from the runway to a disembarking/embarking site at which the inbound passengers disembark the vehicle; and transporting the inbound passengers from the disembarking/embarking site to a terminal building.

In the methods of the second, third and fourth aspects of the present invention, inbound passengers may be processed as follows. After leaving the aircraft, they may pass through an immigration control area in the vehicle, their baggage may be unloaded from the aircraft and collected by the inbound passengers whilst on the vehicle and they may leave the terminal building through a customs control area.

In accordance with a fifth aspect of the present invention, there is provided a method of handling outbound passengers leaving an airport on an aircraft, comprising:

transporting the outbound passengers from a terminal building to a disembarking/embarking site for the outbound passengers to embark a vehicle carrying an aircraft; and transporting the aircraft on the vehicle from the disembarking/embarking site to a runway for the aircraft to take off, the outbound passengers embarking the aircraft on the vehicle.

In the methods of the second, third and fifth aspects of the present invention, outbound passengers may be processed as follows. They may enter the terminal building through a security check area, they may enter the disembarking/embarking site through a security check area and they may pass through a check-in area on the vehicle. Their baggage may be deposited at the check-in area from where it is loaded onto the aircraft.

In accordance with a sixth aspect of the present invention there is provided a method of handling transfer passengers arriving at an airport on a first aircraft, comprising:

when the first aircraft lands on a runway of the airport, conveying the first aircraft onto a first vehicle on which the transfer passengers disembark the first aircraft;

transporting the first aircraft on the first vehicle from the runway to a disembarking/embarking site at which the transfer passengers disembark the first vehicle and proceed to a transit area;

transporting the transfer passengers from the transit area for them to embark a second vehicle carrying a second aircraft;

transporting the second aircraft on the second vehicle from the disembarking/embarking site to the runway for the second aircraft to take off, the transfer passengers embarking the second aircraft on the second vehicle.

In accordance with a seventh aspect of the present invention, there is provided a method of handling transfer passengers arriving at an airport on a first aircraft, comprising:

when the first aircraft lands on a runway of the airport, conveying the first aircraft on a first vehicle on which the transfer passengers disembark the first aircraft;

transporting the first aircraft on the first vehicle from the runway to a disembarking/embarking site at which the transfer passengers disembark the first vehicle;

transporting the transfer passengers from the disembarking/embarking site to a transit area in a terminal building;

transporting the transfer passengers from the terminal building to the disembarking/embarking site for them to embark a second vehicle carrying a second aircraft;

transporting the second aircraft on the second vehicle from the disembarking/embarking site to the runway for the second aircraft to take off, the transfer passengers embarking the second aircraft on the second vehicle.

In accordance with a further aspect of the present invention, there is provided a vehicle for carrying an aircraft on an upper surface thereof, the vehicle having means for enabling passengers to embark/disembark the aircraft which means is moveable between a first position substantially level with or below the upper surface and a second position adjacent the aircraft. The vehicle is preferably self-propelling and may be a barge. The vehicle may also include means for enabling cargo to be loaded/unloaded on/off the aircraft movable in the same manner as the means for enabling passengers to embark/disembark the aircraft.

Reference will now be made, by way of example only to the accompanying drawings in which.

Figure 1:
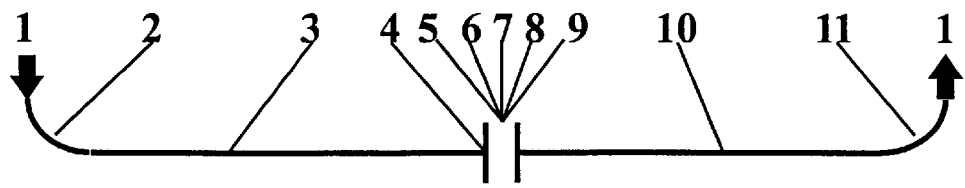
FIG. 1 is a diagrammatic summary of the principles of a conventional system of operating an airport, showing the processing of an aircraft from landing to taking off.

Referring first to FIG. 1, a conventional system operates as follows. An aircraft 1 lands 2 on a runway and taxis 3 to a gate 4 in a terminal building. Here, the inbound passengers disembark 5 and their baggage is unloaded 6. The aircraft is serviced whilst standing at the gate. Outbound passengers 7 board the aircraft, their baggage is loaded 8. Thereafter, the aircraft 1 leaves the gate 4 and taxis 10 to the runway and takes off 11.

Figure 2:
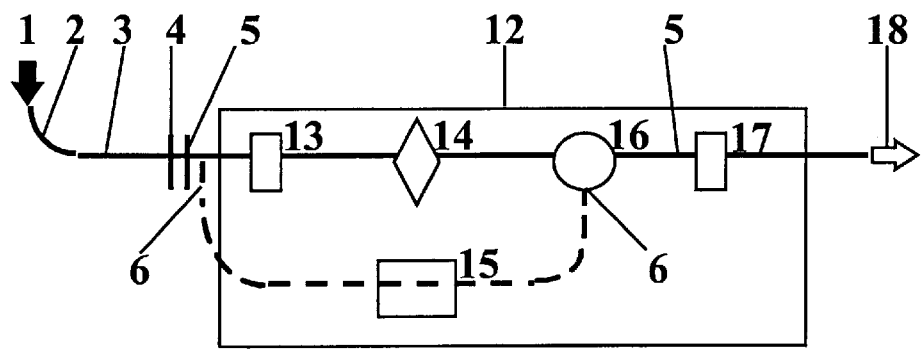
FIG. 2 is a diagrammatic summary of the movement of inbound passengers and their baggage in the system of FIG. 1.

FIG. 2 shows the movement of disembarking passengers in the system of FIG. 1. Aircraft 1 lands 2 on a runway and taxis 3 to gate 4. The inbound passengers disembark 5 at gate 4 and proceed to terminal 12 where they pass through an immigration control area 13 and a duty-free shopping area 14. Their baggage 6 is unloaded from the aircraft 1 at gate 4 and is transported to a baggage sorting area 15 in terminal 12 and thence to a baggage collection area 16, e.g. a baggage carousel. Here, the inbound passengers collect their baggage 6 and proceed through a customs control area 17 and then leave the terminal building 12 for onward transportation 18.

Figure 3:
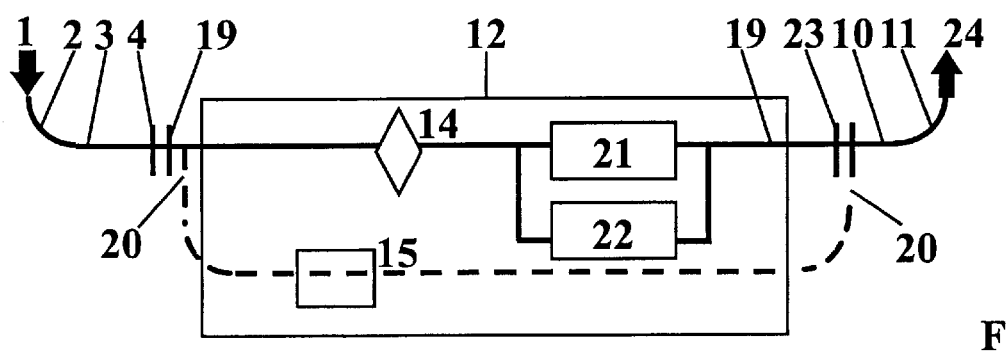
FIG. 3 is a diagrammatic summary of the movement of transfer passengers and their baggage in the system of FIG. 1.

FIG. 3 shows the movement of transfer passengers in the system of FIG. 1. After aircraft 1 taxis to gate 4, the transfer passengers 19 disembark and proceed directly to duty-free shopping area 14 and thence to a transit lounge 21 or transit hotel 22 in terminal 12. When ready to depart, the transfer passengers 19 leave terminal 12 and proceed to a second gate 23 and board a second aircraft 24. Their baggage 20 is unloaded from aircraft 1 at gate 4 and is transported to baggage sorting area 15 in terminal 12. It is then transported to second gate 23 and is loaded onto second aircraft 24, which then leaves second gate 23 and taxis 10 to a runway and takes off 11.

Figure 4:
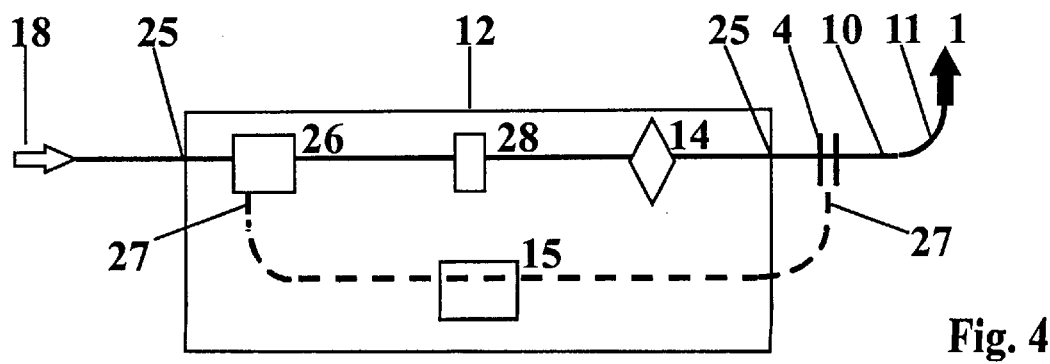
FIG. 4 is a diagrammatic summary of the movement of outbound passengers and their baggage in the system of FIG. 1.

FIG. 4 shows the movement of outbound passengers 25 in the system of FIG. 1. Outbound passengers 25 arrive at terminal 12 by means of transportation 18 and proceed to check-in area 26. After this, they pass through immigration control area 28 to duty-free shopping area 14 and then to gate 4 to board aircraft 1. Their baggage 27 is passed from check-in area 26 to baggage sorting area 15 and thence to gate 4 where it is loaded on aircraft 1, which then taxis 11 to a runway and takes off 11.

Figure 5:
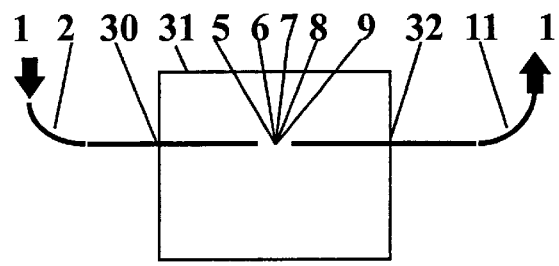
FIG. 5 is a diagrammatic summary of the principles of a system of operating an airport according to the present invention, showing the processing of an aircraft from landing to taking off.

FIGS. 5–9 illustrate one embodiment of the system of operating an airport according to the present invention. Referring first to FIG. 5, an aircraft 1 lands 2 on a runway which is on a platform built above the sea. The aircraft is then conveyed 30 onto a barge 31 floating on the sea by driving or taxiing onto the barge. Alternatively, the aircraft may be conveyed onto the barge by another means, such as an ancillary vehicle or a conventional railed push-pull nose wheel system. The inbound passengers then disembark 5 the aircraft 1, their baggage is unloaded 6 and the aircraft 1 is serviced 9. Then outbound passengers board 7 the aircraft 1, their baggage is loaded 8 onto the aircraft 1, which then leaves 32 barge 31 and proceeds to the runway and takes off 11. The barge 31 is not stationary during this process and various operations take place whilst the aircraft is standing on the barge.

Figure 6:
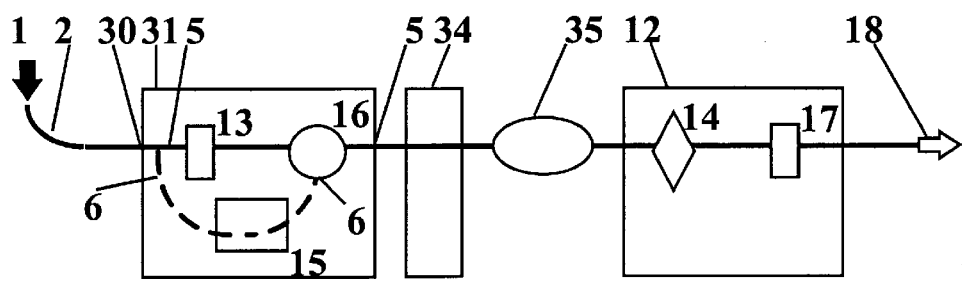
FIG. 6 is a diagrammatic summary of the movement of inbound passengers and their baggage in the system of FIG. 5.

Thus, FIG. 6 illustrates the movement of inbound passengers in the system of FIG. 5. Aircraft 1 lands 2 on the runway and boards 30 the barge 31. The inbound passengers disembark 5 and pass through an immigration control area 13. Their baggage 6 is unloaded from the aircraft 1 and is transported to a baggage sorting area 15 and thence to a baggage collection area 16, where the inbound passengers collect their baggage 6. All of this activity takes place on barge 31, whilst barge 31 is proceeding along a waterway towards a port 34. The barge 31 then docks at port 34 where the inbound passengers leave barge 31 and are conveyed by a high-speed transporter 35 to a terminal 12. Here, they proceed through a duty-free shopping area 14 and a customs control area 17, and then leave the terminal building 12 for onward transportation 18.

Figure 7:
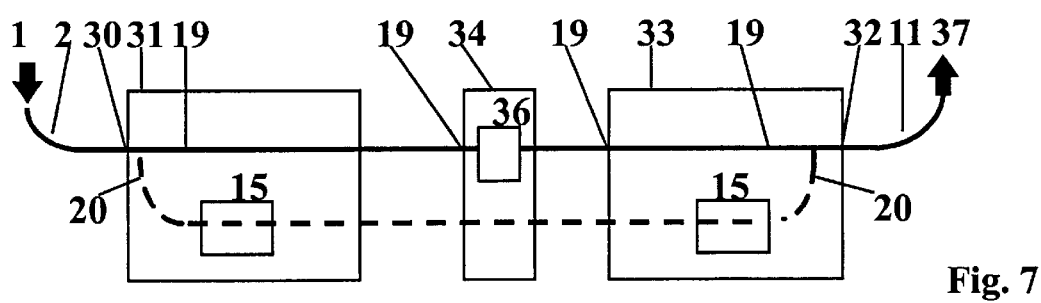
FIG. 7 is a diagrammatic summary of the movement of transfer passengers and their baggage in the system of FIG. 5.

FIG. 7 shows the movement of transfer passengers in the system of FIG. 5. After aircraft 1 boards barge 31, the transfer passengers 19 disembark. When the barge 31 docks at port 34, the transfer passengers 19 leave the barge 31 and proceed to a transit lounge 36 in port 34. When ready to depart, the transfer passengers 19 board a second barge 33, which leaves port 34, and board a second aircraft 37. Their baggage 20 is unloaded from aircraft 1 and is transported to baggage sorting area 15 on barge 31. It is then transported to second barge 33 via port 34 and is loaded onto second aircraft 37. Once fully loaded, second aircraft 37 leaves 32 the second barge 33 and proceeds to a runway and takes off 11.

Figure 8:
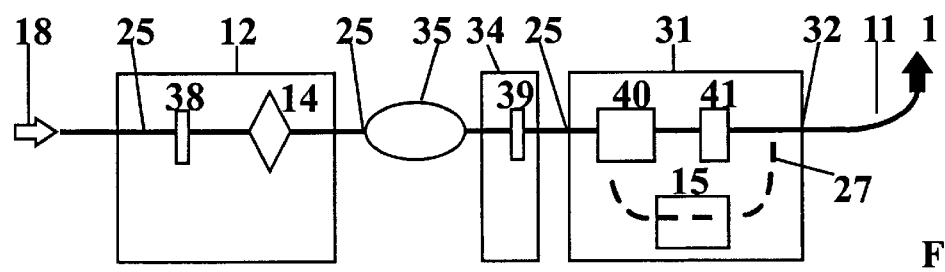
FIG. 8 is a diagrammatic summary of the movement of outbound passengers and their baggage in the system of FIG. 5.

FIG. 8 shows the movement of outbound passengers 25 in the system of FIG. 5. Outbound passengers 25 arrive at terminal 12 by means of transportation 18 and pass through a security check area 38 where they may present their tickets and passports so as to be able to enter duty-free shopping area 14. The outbound passengers are then conveyed by a high-speed transporter 35 to port 34 where they pass through a further security check area 39. At security check area 39, the identity of the outbound passengers may be checked or security checks may be carried out on the passengers and their luggage. The outbound passengers then board barge 31 and proceed to check-in area 40. After this, they pass through an immigration control area 41 and board aircraft 1. Their baggage 27 is passed from check-in area 40 to baggage sorting area 15 and is loaded onto aircraft 1, which then leaves barge 31 and takes off 11 from a runway.

Figure 9:
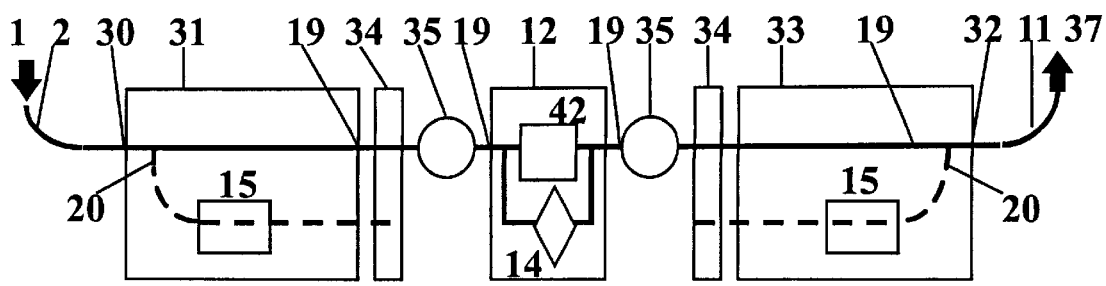
FIG. 9 is a diagrammatic summary of an alternative movement of transfer passengers and their baggage in the system according to the present invention, whereby those passengers proceed to/from a transit hotel.

FIG. 9 shows an alternative movement of transfer passengers 19 in the system of FIG. 5. In this, the transfer passengers leave the barge 31 to arrive at port 34 as in FIG. 7. However, they are conveyed by high speed people transporter 35 to the terminal 12 where they can proceed to duty-free shopping area 14 and/or transit hotel 42 prior to reboarding high speed transporter 35 to return to port 34. Here, they board second barge 33 and second aircraft 37 in the same manner as in FIG. 7.

Figure 11:
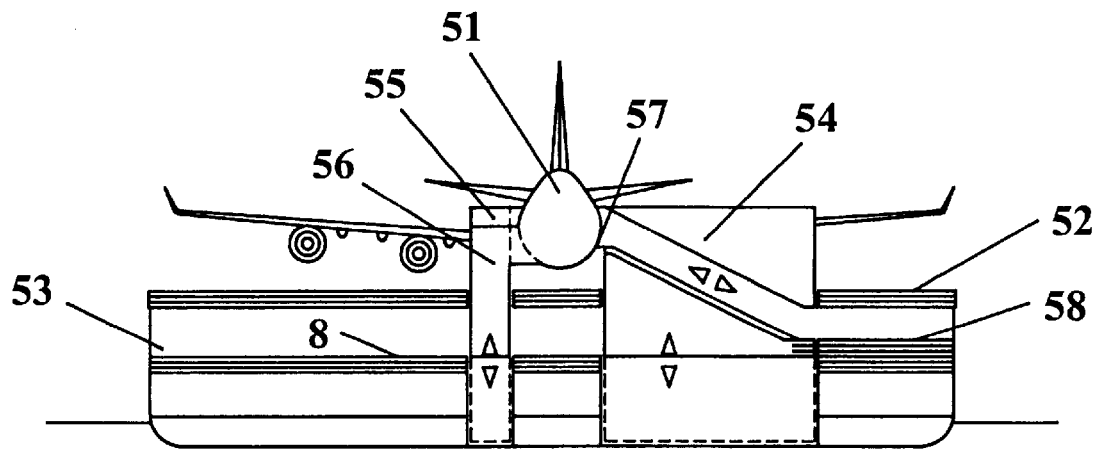
FIG. 11 is a sectional view of the vehicle of FIG. 10.
Figure 10:
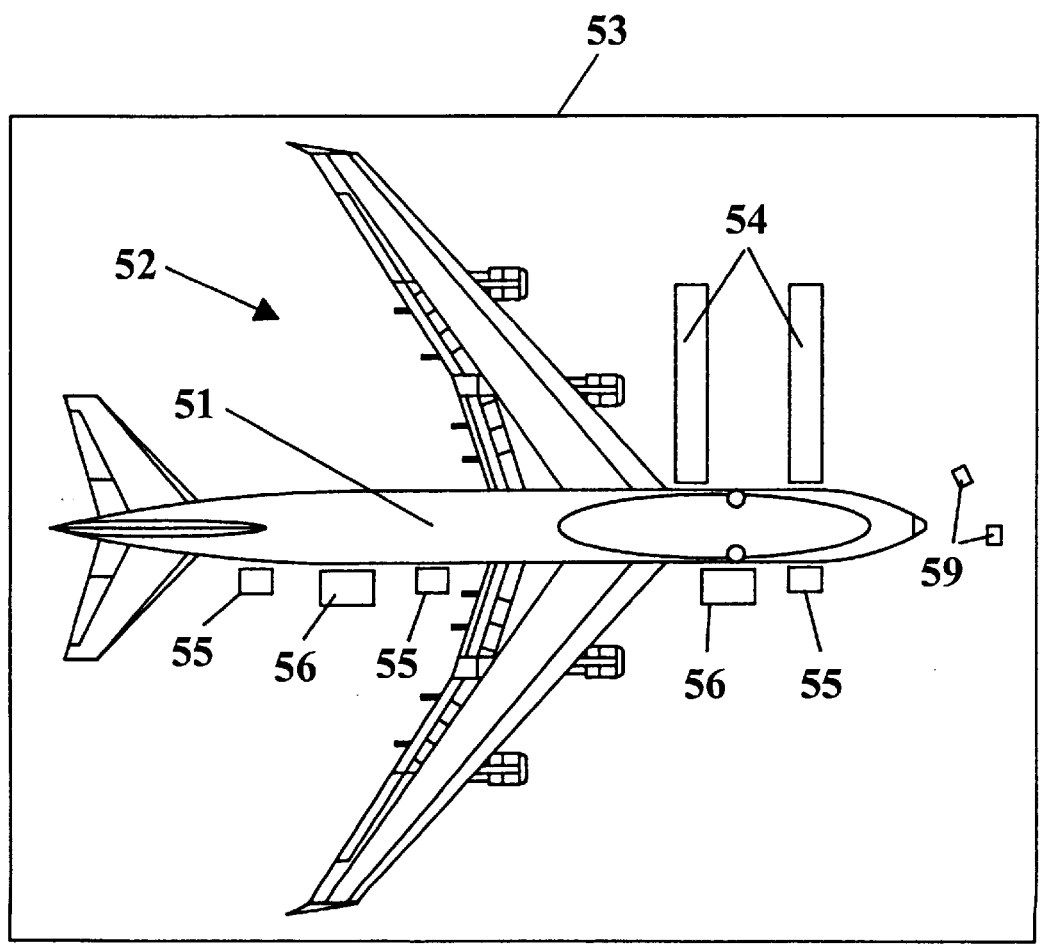
FIG. 10 is a schematic plan view of a vehicle in accordance with one embodiment of the invention, carrying an aircraft.

Referring now to FIGS. 10 and 11, a barge 53 is shown in more detail. Barge 53 is self-propelled, being powered to move in all directions, and is illustrated carrying an aircraft 51 on the upper deck 52 thereof. Passenger escalators 54 and baggage container elevators 56 extend from lower deck 58 towards access door level 57 of aircraft 51 to allow passengers and their baggage to embark/disembark the aircraft from/to lower deck 58. In addition, service elevators 55 extend from lower deck 58 towards aircraft 51 to allow service personnel and equipment to access the aircraft. Upper deck 52 includes an aircraft parking guidance system 59 which guides the aircraft into the correct position on the barge 51.

Passenger escalators 54, baggage container elevators 56, service elevators 55 and aircraft parking guidance system 59 are all moveable upwardly to the respective positions shown in FIG. 10. In addition, units for aircraft refuelling, power, pre-conditioned air, lavatory service, water service, and compressed air for starting the aircraft engines (all of which are based on conventional units and are not shown) are moveable upwardly to operational positions on the upper deck 52. However, when an aircraft is not present on upper deck 52, all of these items can be lowered such that upper deck 52 is free for an aircraft to drive/be towed onto/off the deck.

When an aircraft is conveyed onto or off a barge docked at the runway, the barge may be supported from below by jacks located on the seabed in order to increase the stability thereof. Furthermore, the barges may be specific for a particular type or series of aircraft (e.g. the positions of access doors of a Boeing 747 may be the same as those for a Boeing 737, etc). However, it is desirable that each barge can handle as many different aircraft as possible.

Servicing of the aircraft takes place whilst barge 52 is travelling from runway to port 34, whilst docked at port 34 and whilst travelling from port 34 to runway. It is anticipated that each barge is capable of servicing two to three aircraft before it must be serviced itself.

Figure 12:
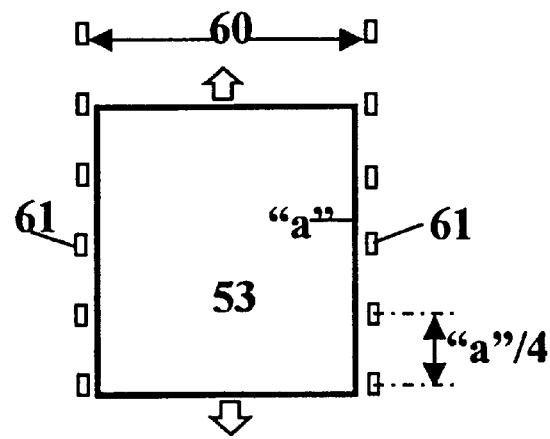
FIG. 12 is a plan view of a vehicle being guided along a guideway.

Referring now to FIG. 12, barge 53 is shown moving within a predetermined path waterway 60 which is defined by a series of guides 61. Guides 61 are positioned a distance "a/4" apart where "a" is the length of the barge.

Figure 13:
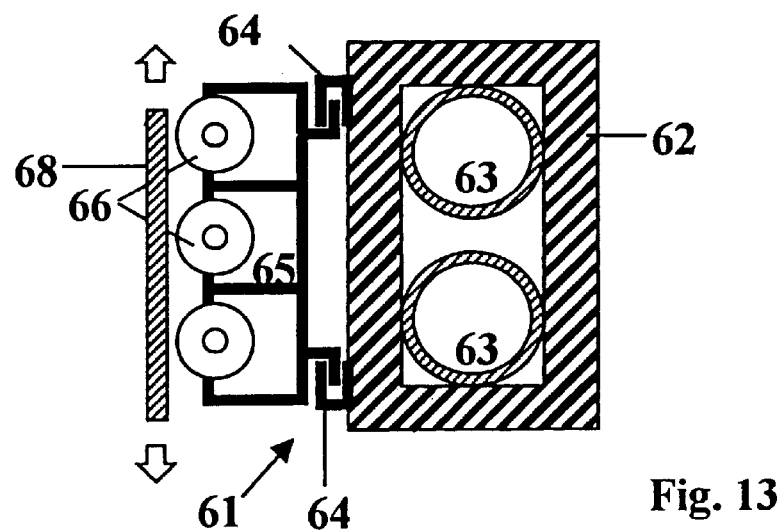
FIG. 13 is a plan view of a guide post which delimits the guideway of FIG. 12.
Figure 14:
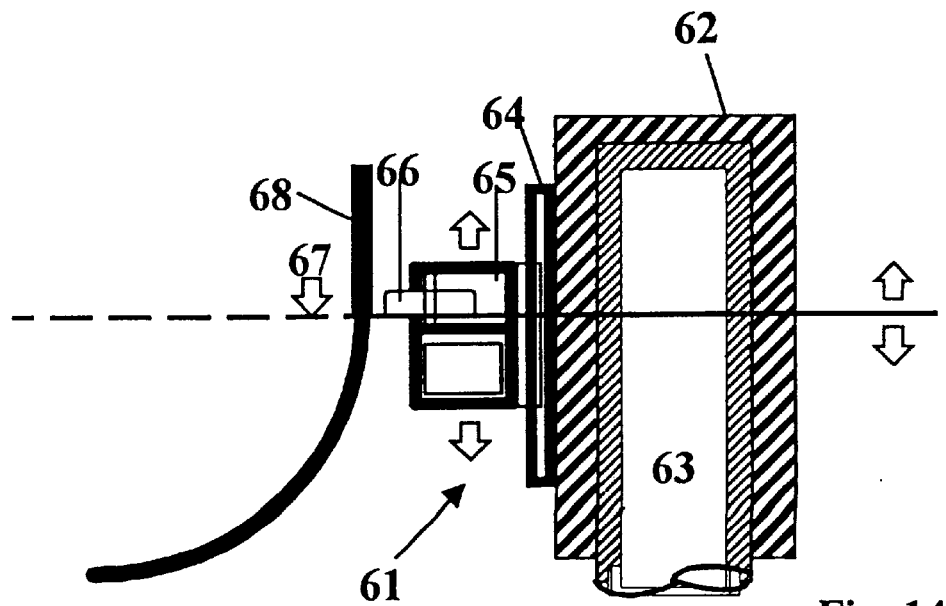
FIG. 14 is a sectional view of the guide post of FIG. 13.

As shown in FIGS. 13 and 14, guide 61 comprises a pre-cast concrete pilecap 62 which is supported by concrete piles 63 sunk into the seabed and includes slides 64 extending therefrom. Attached to slides 64 is a floating roller mechanism 65 containing rollers 66 which contact the side 68 of a barge. It will be appreciated that roller mechanism 65 floats and is located in slides 64 to allow it to float in the sea despite variations in sea level 67.

The runway of the airport of the present invention may be located entirely (or partially) on a platform above the sea, with the terminal building being onshore and the barges running between the terminal building and the runway. Alternatively, the runway and the terminal building may be located on the shore with the barges running therebetween.

In addition, it is preferred if there is more than one port for the barges to dock at, thus allowing more than one aircraft to be loaded/unloaded at a time. The port(s) may be physically separate from the terminal building, being built either on land or above the sea, or may be a part of the terminal building. The airport may also include an aircraft maintenance area on land in which aircraft can be repaired, etc, and which is accessed by an aircraft by means of the barge carrying that aircraft docking at the maintenance area and leaving the barge. The airport preferably also includes an area in which the barges are serviced.

In the foregoing, the present invention has been described with reference to a runway on a platform above the sea (either in whole or in part), with the vehicle being a self-propelled barge operating within a system of contained movement paths (barge taxiways). The present invention is not limited to this specific example. For example, it is possible that the runway is supported above the sea by other means or that the runway is constructed on land or above another body of water, such as a river or a lake. The vehicle need not be a barge and need not operate only over a body of water.

Furthermore, it is contemplated within the scope of the present invention that the barge could be converted to be used for alternative purposes, for example in times of national emergency, disaster relief or military action. For example, a plurality of barges could be connected together for utilisation as a mobile base for fighter aircraft.

I claim:

1. An airport system comprising:
    a runway for an aircraft to land on or take off from;
    at least one floating barge for carrying aircraft through water from or to the runway and to or from an embarking or disembarking site at which passengers disembark or embark to the at least one barge, said at least one barge being separate from said runway and distinct from where the aircraft lands with said at least one barge having dimensions insufficient to support a runway;
    a terminal building; and
    said barge transports passengers from or to the disembarking or embarking site and to or from the terminal building;
    said barge including a check-in area, an immigration control area for outbound passengers, a device for loading or unloading baggage from the aircraft, a device for passengers to embark or disembark the aircraft, a sorter for inbound passengers to collect their baggage and facilities for servicing the aircraft,
    said barge traveling along predetermined paths between the runway and the disembarking or embarking site, the predetermined paths being confined waterways.

2. An airport system as claimed in claim 1, wherein the runway is built over the sea.

3. An airport system as claimed in claim 1, wherein the disembarking or embarking site includes a transit lounge for transfer passengers.

4. An airport system as claimed in claim 1, wherein the disembarking or embarking site includes a security check area for outbound passengers.

5. An airport system as claimed in claim 1, wherein the terminal building includes a security check area for outbound passengers.

6. A method of operating an airport, the method comprising:
    landing an aircraft on a runway,
    conveying the aircraft onto a barge having dimensions insufficient to support the runway and on which inbound passengers disembark the aircraft;
    transporting the aircraft on the barge from the runway to a site for disembarking or embarking, the inbound passengers disembarking the barge when the barge arrives at the site;
    transporting the inbound passengers from the site to a terminal building;
    transporting outbound passengers from the terminal building to the site for the outbound passengers to embark the barge; and
    transporting the aircraft on the barge from the site to the runway from which the aircraft is to take off, the outbound passengers embarking the aircraft on the barge,
    the aircraft being serviced whilst it is on the barge.

7. A method as claimed in claim 6, wherein the inbound passengers pass through an immigration control area in the barge.

8. A method as claimed in claim 6, wherein the baggage of the inbound passengers is unloaded from the aircraft and is collected by the inbound passengers whilst on the barge.

9. A method as claimed in claim 6, wherein the inbound passengers leave the terminal building through a customs control area.

10. A method as claimed in claim 6, wherein the outbound passengers enter the terminal building through a security check area.

11. A method as claimed in claim 6, wherein the outbound passengers enter the site through a security check area.

12. A method as claimed in claim 6, wherein the outbound passengers pass through a check-in area on the barge.

13. A method as claimed in claim 12, wherein the baggage of th outbound passengers is deposited at the check-in area from where it is loaded onto the aircraft.

14. A method of operating an airport, the method comprising:

landing an aircraft on a runway of the airport, conveying the aircraft onto a barge having dimensions insufficient to support the runway and on which inbound passengers of the aircraft disembark the aircraft;

transporting the aircraft on the barge having dimensions insufficient to support the runway and from the runway to a site for disembarking or embarking at which the inbound passengers disembark the barge;

transporting the inbound passengers from the site to a terminal building;

transporting outbound passengers from the terminal building to the site for the outbound passengers to embark the barge; and transporting the aircraft on the barge from the site to the runway for the aircraft to take off, the outbound passengers embarking the aircraft on the barge, the aircraft being serviced whilst it is on the barge.

15. A method of handling inbound passengers arriving at an airport on an aircraft, comprising:

landing the aircraft on a runway of the airport;

conveying the aircraft onto a barge having dimensions insufficient to support the runway and on which the inbound passengers disembark the aircraft;

transporting the aircraft on the barge from the runway to a site at which the inbound passengers disembark the barge; and transporting the inbound passengers from the site to a terminal building.

16. A method as claimed in claim 15, wherein the inbound passengers pass through an immigration control area in the barge.

17. A method as claimed in claim 15, wherein baggage of the inbound passengers is unloaded from the aircraft and is collected by the inbound passengers whilst on the barge.

18. A method as claimed in claim 15, wherein the inbound passengers leave the terminal building through a customs control area.

19. A method of handling outbound passengers leaving an airport on an aircraft, comprising:

transporting the outbound passengers from a terminal building to a site for the outbound passengers to embark a barge carrying an aircraft, said barge having insufficient dimensions to support a runway for the aircraft; and transporting the aircraft on the barge from the site to the runway for the aircraft to take off, the outbound passengers embarking the aircraft on the barge.

20. A method as claimed in claim 19, wherein the outbound passengers enter the terminal building through a security check area.

21. A method as claimed in claim 19, wherein the outbound passengers enter the site through a security check area.

22. A method as claimed in claim 19, wherein the outbound passengers pass through a check-in area on the barge.

23. A method as claimed in claim 22, wherein baggage of the outbound passengers is deposited at the check-in area from where it is loaded onto the aircraft.

24. A method of handling transfer passengers arriving at an airport on a first aircraft, comprising:

landing the first aircraft on a runway of the airport, conveying the first aircraft onto a first barge having dimensions insufficient to support the runway and on which the transfer passengers disembark the first aircraft;

transporting the first aircraft on the first barge from the runway to a site at which the transfer passengers disembark the first barge and proceed to a transit area;

transporting the transfer passengers from the transit area for them to embark a second barge having dimensions insufficient to support the runway and carrying a second aircraft;

transporting the second aircraft on the second barge from the site to the runway for the second aircraft to take off, the transfer passengers embarking the second aircraft on the second barge.

25. A method as claimed in claim 24, wherein the transit area comprises at least one of a transit hotel, a transit lounge, and a duty-free shopping area.

26. A method of handling transfer passengers arriving at an airport on a first aircraft, comprising:

landing the first aircraft on a runway of the airport, conveying the first aircraft on a first barge having dimensions insufficient to support the runway and on which the transfer passengers disembark the first aircraft;

transporting the first aircraft on the first barge from the runway to a site at which the transfer passengers disembark the first barge;

transporting the transfer passengers from the site to a transit area in a terminal building;

transporting the transfer passengers from the terminal building to the site for the transfer passengers to embark a second barge having dimensions insufficient to support the runway and carrying a second aircraft;

transporting the second aircraft on the second barge from the site to the runway for the second aircraft to take off, the transfer passengers embarking the second aircraft on the second barge.

* * * * *

UNITED STATES PATENT AND TRADEMARK OFFICE
CERTIFICATE OF CORRECTION

PATENT NO. : 6,102,331
DATED : August 15, 2000
INVENTOR(S) : Lee Pee Hong

It is certified that error appears in the above-identified patent and that said Letters Patent is hereby corrected as shown below:

-- [76]  Inventor: Lee Pee Hong, No. 446, Jalan Desa Utama, Taman Desa off Jalan Klang Lama, Kuala Lumpur, 58100 Malaysia Signed and Sealed this Eighteenth Day of December, 2001

*Attest:*

JAMES E. ROGAN
*Attesting Officer*   *Director of the United States Patent and Trademark Office*